United States Patent [19]
James

[11] Patent Number: 5,923,374
[45] Date of Patent: Jul. 13, 1999

[54] METHOD AND APPARATUS FOR REDUCED-BANDWIDTH TRANSMISSION OF TELEVISION SIGNALS

[75] Inventor: Jack Elden James, Indianapolis, Ind.

[73] Assignee: Lucent Technologies Inc., Murray Hill, N.J.

[21] Appl. No.: 08/693,626

[22] Filed: Aug. 8, 1996

[51] Int. Cl.[6] ................................................. H04N 7/12
[52] U.S. Cl. .................... 348/388; 348/426; 348/384; 348/385; 348/470
[58] Field of Search ................... 348/384, 388, 348/396, 484, 724, 642, 426, 385, 386, 470, 493; 358/31, 12, 11, 4; 178/5.4 CD; H04N 7/04, 7/12

[56] References Cited

U.S. PATENT DOCUMENTS

| | | | |
|---|---|---|---|
| 3,609,223 | 9/1971 | Hisao Tajiri et al. ............ | 178/5.4 CD |
| 4,123,774 | 10/1978 | Hjortzberg ................................. | 358/4 |
| 4,314,273 | 2/1982 | Amery ....................................... | 358/11 |
| 4,731,660 | 3/1988 | Faroudja et al. ......................... | 358/31 |
| 4,943,849 | 7/1990 | Faroudja et al. ......................... | 358/12 |
| 5,006,927 | 4/1991 | Creed et al. ............................... | 358/31 |
| 5,214,501 | 3/1993 | Cavallerano .............................. | 358/12 |
| 5,402,180 | 3/1995 | Jung ......................................... | 348/642 |

*Primary Examiner*—Tommy P. Chin
*Assistant Examiner*—Gims Philippe
*Attorney, Agent, or Firm*—Gregory A. Welte

[57] ABSTRACT

A system for reducing bandwidth of video signals. Ordinarily, an NTSC (National Television Standards Committee) video signal has (a) a bandwidth of 6.0 MHz, (b) chrominance and luminance carriers separated by about 3.58 MHz, and (c) an audio carrier located at the upper end of the 6.0 MHz bandwidth. The invention reduces the separation between chrominance and luminance carriers to about 2.15 MHz, and decreases the bandwidth to about 4.0 MHz. In addition, the invention moves the audio carrier outside the 4.0-MHz bandwidth. The invention allows multiple channels, of 4.0 MHz bandwidth each, to be placed adjacent each other in a cable television spectrum, and the audio signals of the channels to be placed together, at the upper end of the spectrum, outside the range allocated to the video information. A larger number of channels is obtained than would otherwise be available, because the upper end of the spectrum is not suitable for carrying video information, but will handle audio information.

14 Claims, 15 Drawing Sheets

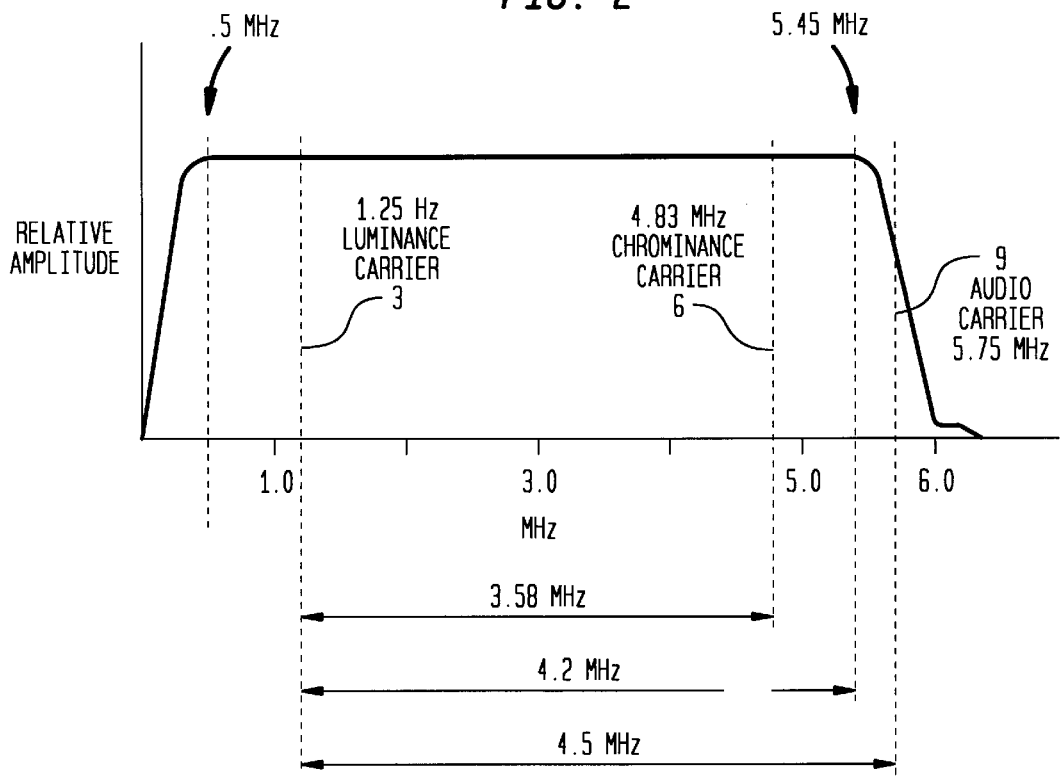
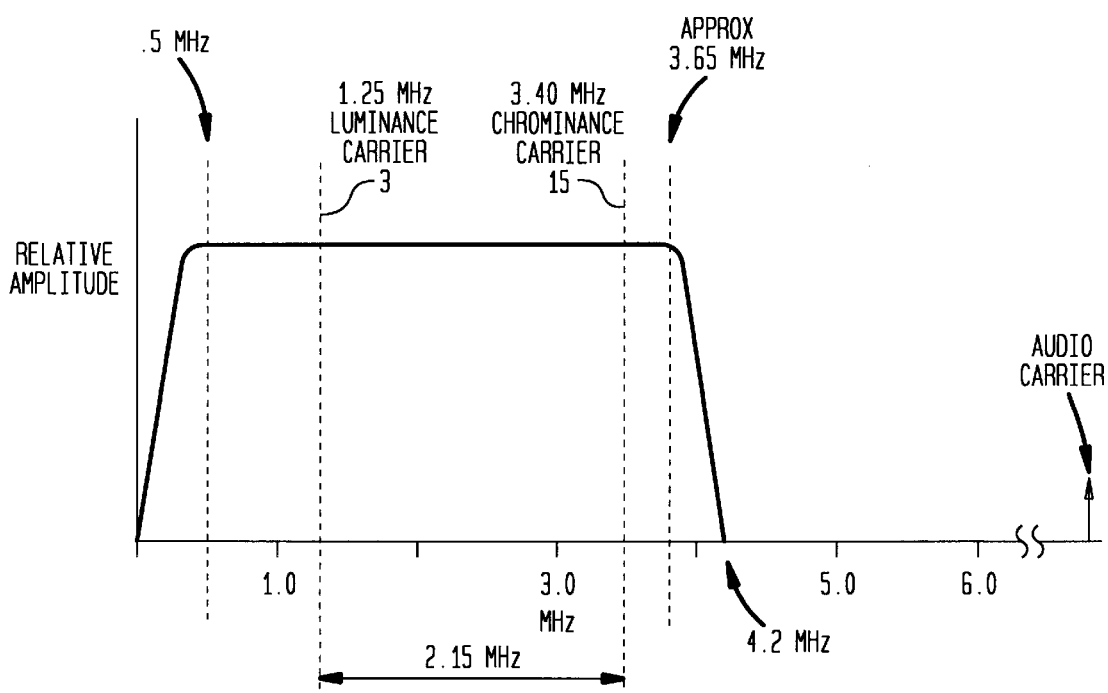

METHOD AND APPARATUS FOR REDUCED-BANDWIDTH TRANSMISSION OF TELEVISION SIGNALS

The invention concerns reducing bandwidth of television signals, thereby allowing a larger number of television channels can be carried by a given transmission medium, such as a cable television network.

BACKGROUND OF THE INVENTION

Cable television networks are likely candidates for carrying video conferences, partly because of their extensive installed customer base. However, two opposing factors are at work: (1) a normal video signal occupies a somewhat large bandwidth of about 6.0 MHz, while (2) the available unused capacity of cable networks is limited, and cannot accommodate a large number of such video signals. These two factors place a constraint on the number of video conferences which can be carried by a cable network.

SUMMARY OF THE INVENTION

In one form of the invention, a reduction in bandwidth of a video signal is attained by reducing the frequency separation between the chrominance and luminance carriers of a composite video signal.

In another form of the invention, the audio carrier is moved outside the composite video signal, thereby allowing the audio carrier to be placed at frequencies not suitable for video transmission. As a result, frequency ranges which are not usable for composite video signals containing audio signals can be used.

BRIEF DESCRIPTION OF THE DRAWINGS

FIG. 2 illustrates a composite video signal in greater detail. The frequencies indicated are "baseband" frequencies, meaning that they are measured with respect to the zero frequency of the pass-band, which is about 6 MHz in this example.

FIG. 3 illustrates a composite video signal used by one form of the invention.

DETAILED DESCRIPTION OF THE INVENTION

Composite Video Signal

Figure 1A:
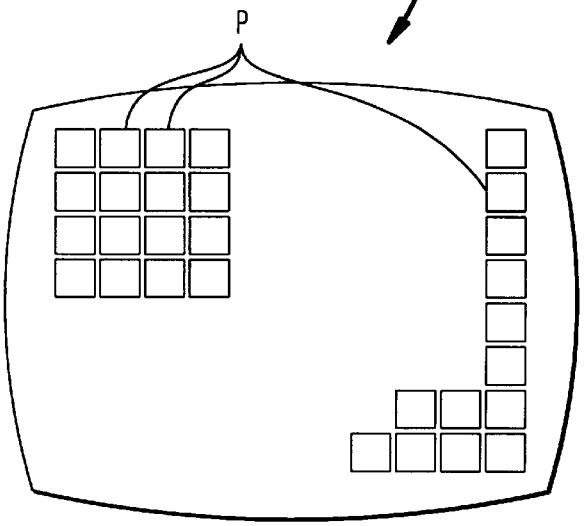
FIG. 1A illustrates pixels within a video image.

A television picture can be viewed as consisting of individual pixels P, shown in FIG. 1A. Each pixel requires two types of information from the television signal, namely, brightness (or luminance) information and color (or chrominance) information. These two types of information are transmitted on separate carrier signals, as indicated in FIG. 1B.

The luminance carrier 3, and its sidebands (not shown), carry the luminance information, and the chrominance carrier 6, and its sidebands (not shown), carry the color information. These two signals together, plus their sidebands, form a "composite" video signal. A "composite" signal should be distinguished from another type, wherein the chrominance- and luminance carriers, and their sidebands, are carried by separate, individual transmission lines, as occurs in some types of video cameras.

Figure 1B:
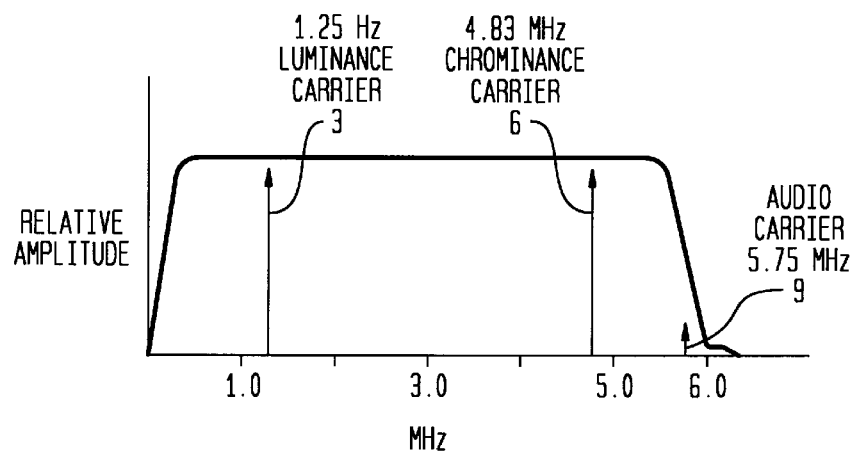
FIG. 1B illustrates a simplified composite video signal.

In FIG. 1B, an audio carrier 9 carries the sound which accompanies the television picture.

FIG. 2 is a more detailed view of the composite video signal, and illustrates a signal meeting the standards of the National Television Standards Committee (NTSC). Several significant features of this signal are the following.

1. The bandwidth allocated to the composite signal is 6.0 MegaHertz (MHz).
2. The luminance carrier 3 is located at 1.25 MHz above the lower limit (namely, zero Hz) of the 6.0 MHz bandwidth.
3. The chrominance subcarrier 6 is located at 4.83 MHz above the lower limit, and is separated by 3.58 MHz from the luminance carrier 3, as indicated.
4. The audio carrier is located at 5.75 MHz above the lower limit, as indicated, and is separated by 4.5 MHz from the luminance carrier 3, as indicated.
5. The upper 3-dB cut-off of the 6.0 MHz bandwidth occurs at 5.45 MHz, thus allocating 4.2 MHz of bandwidth to the upper sidebands of the luminance carrier, as indicated.

One Form of Invention

One form of the invention transmits a television signal using a composite video signal shown in FIG. 3, which is similar to that of FIG. 2, but with certain modifications. Under the invention, the luminance carrier 3 is located at 1.25 MHz, as in the prior-art signal of FIG. 2. However, the invention places the chrominance carrier 15 at 2.15 MHz above the luminance carrier, at 3.40 MHz, as indicated. The channel allocated to the entire composite signal begins to roll off at about 3.65 MHz, as indicated, and the channel terminates at about 4.2 MHz, as indicated. The total bandwidth occupied by the video signal is about 4.2 MHz, as compared to 6.0 MHz in FIG. 2.

The audio carrier 18 in FIG. 3 is located outside the bandwidth allocated to the video signal, as indicated. The bandwidth allocated to the audio carrier depends upon the particular application, but preferably lies within the range of 25 to 75 Kilo-Hertz (KHz), and preferably less than 100 KHz. Since 100 KHz corresponds to 0.100 MHz, the overall bandwidth occupied by both video and audio signals is 4.300 MHz.

By using such a composite signal, a larger number of television signals can be transmitted along a cable television network, as compared to using the prior-art composite signal of FIG. 2. For example, in FIG. 4, if each channel is allotted a bandwidth of 4.0 MHz (that is, slightly smaller than the bandwidth of 4.2 MHz in FIG. 3), then video information for seven channels can occupy the frequencies spanning from 4 to 32 MHz, as indicated. The corresponding seven audio carriers can occupy the range spanning from 32 MHz to 33 MHz, as indicated. The overall bandwidth (video plus audio) for the seven video channels is about 33 MHz, as compared with 42 MHz which would be required for seven NTSC channels.

Figure 4:
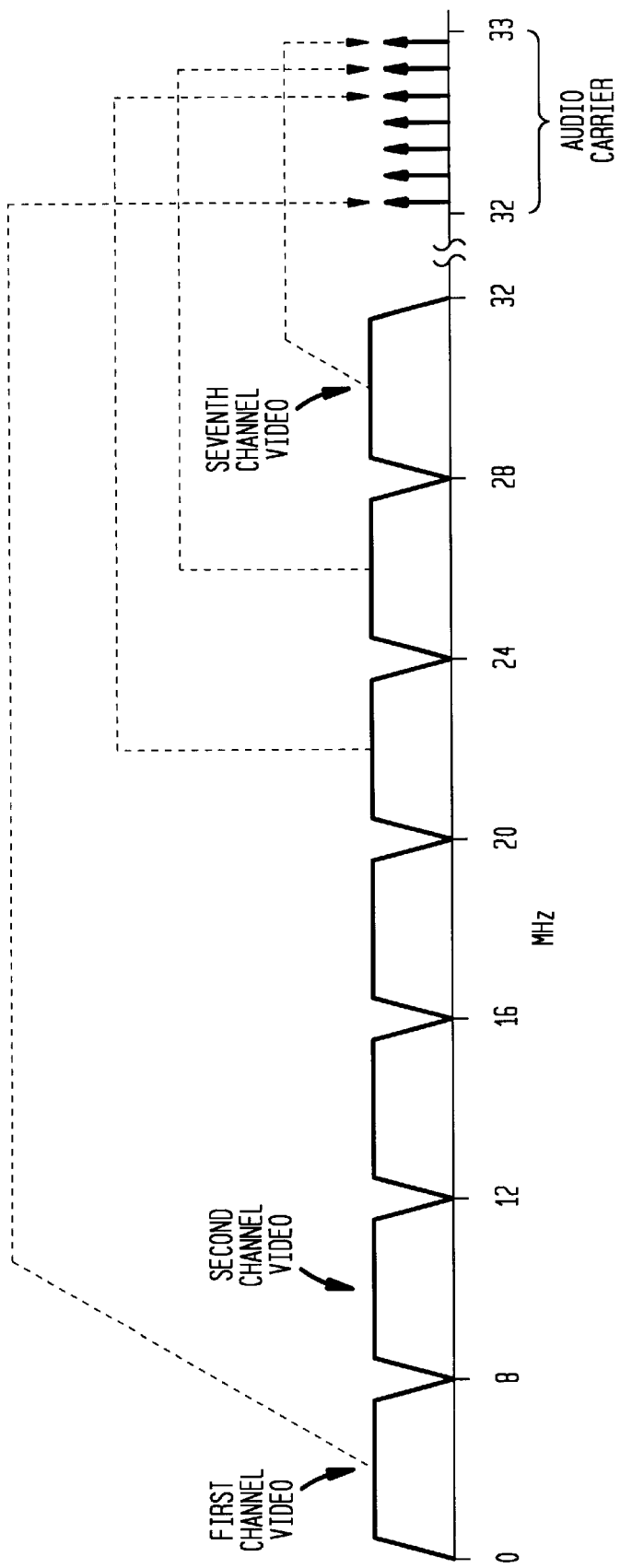
FIG. 4 illustrates multiple composite video signals, of the type shown in FIG. 3, positioned adjacent, within a frequency range in a cable television network. The frequencies indicated are absolute frequencies, rather than baseband frequencies.

One feature of FIG. 4 is that the audio carriers occupy a frequency range (about 32 MHz to 33 MHz, absolute frequency) which is not suitable for transmission of video information, primarily because the phase delay of the cable network in this range varies too greatly as a function of frequency. However, the human ear is not sufficiently sensitive to the variation in phase delay, thereby allowing use of this frequency range for transmission of audio information. Restated, this frequency range does carry video signals in an optimal manner, but can be used for audio signals.

One Architecture

Figure 5:
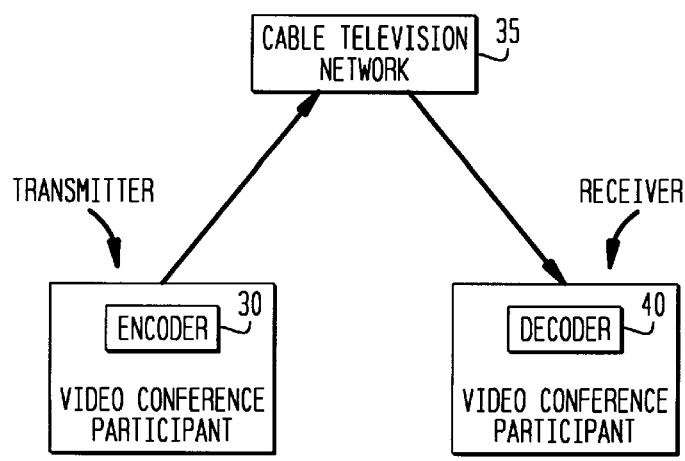
FIG. 5 is an architecture of one form of the invention.
Figure 6:
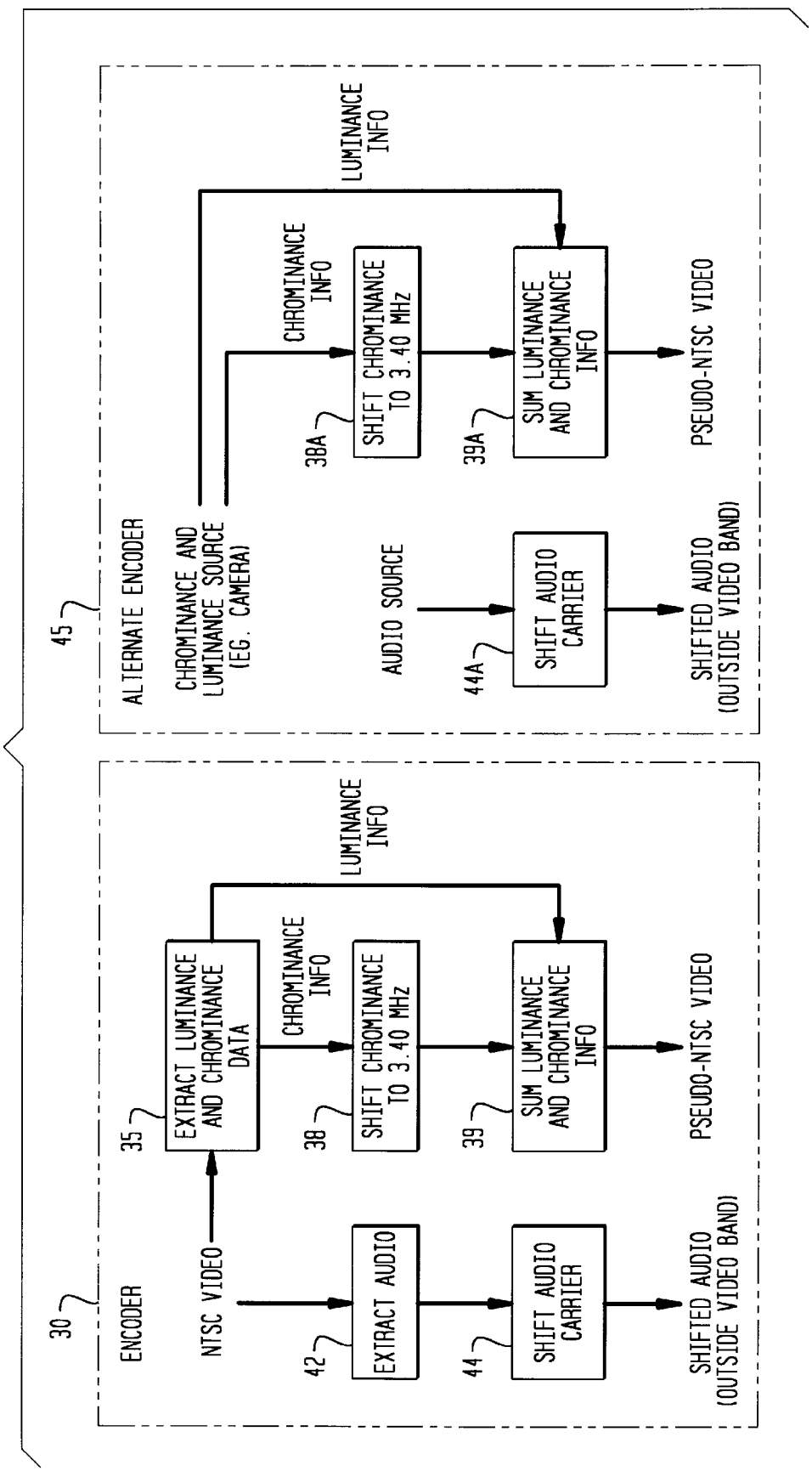
FIG. 6 illustrates one form of an encoder 30 of FIG. 5.

In one form of the invention, a cable television network is used to carry video conferences. FIG. 5 illustrates an overview of one architecture of the video conferencing system. To avoid redundancy, FIG. 5 illustrates one-way transmission, from an encoder 30 to a decoder 40. In practice, both conference participants are expected to be equipped with an encoder and a decoder, so that two-way transmission will occur. FIG. 6 illustrates processing which occurs in the encoder 30 of FIG. 5.

Within the encoder 30, block 35 receives an NTSC video signal, and extracts the luminance and chrominance information. Block 38 shifts the chrominance carrier to 3.40 MHz, to the position shown in FIG. 3. Block 39 in FIG. 6 combines the luminance carrier with the shifted chrominance carrier, to produce a composite video signal.

An audio processor performs two primary functions: (1) it extracts the audio signal from the NTSC signal, as indicated in block 42, and (2) shifts the audio carrier to a suitable frequency, in block 44, to position the audio carrier as shown in FIGS. 3 and 4.

FIG. 6 also illustrates an alternate encoder 45, which can be used when the video signal is generated by equipment which provides the luminance carrier and the chrominance carrier as separate signals, rather than contained in a single, composite signal. Video cameras, used in video conferencing, provide examples of such equipment. With such separate signals, the signal extraction indicated by block 35 in encoder 30 is not necessary, and can be eliminated, as indicated by its absence in encoder 45.

In the alternate encoder 45, the separated luminance and chrominance signals are received directly, and processed, by blocks 39A and 38A, in the manner described in connection with encoder 30.

The encoder output, produced by block 39 in encoder 30 or block 39A in encoder 45, will be called a "pseudo-NTSC" signal, as indicated, and is of the type shown in FIG. 3. The pseudo-NTSC signal is transmitted along the cable network 35 of FIG. 5, to a receiver, wherein a decoder 40 transforms it into an actual NTSC signal, for use by a standard television receiver.

Figure 7:
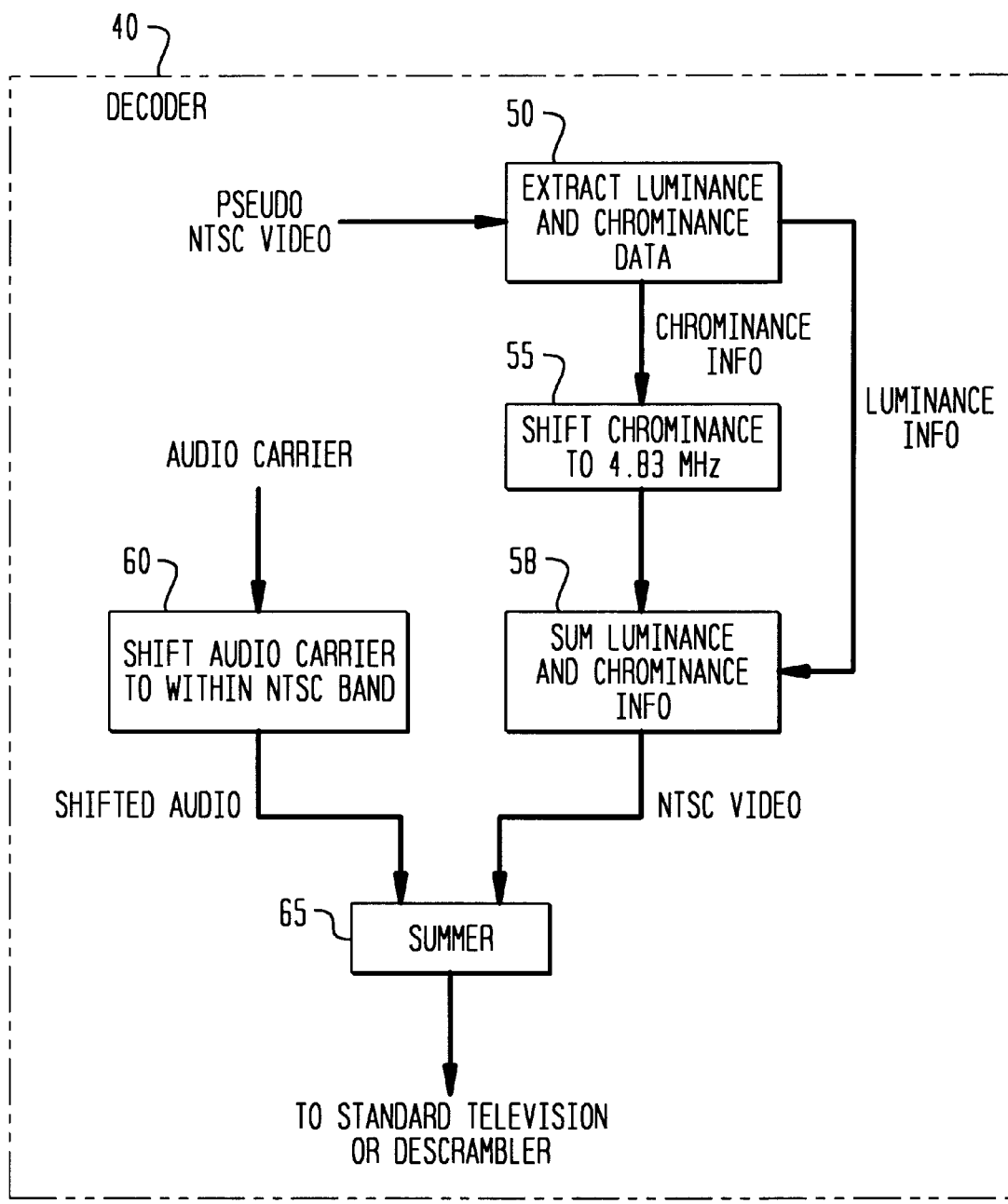
FIG. 7 illustrates one form of a decoder 40 of FIG. 5.

FIG. 7 shows such a decoder 40. Block 50 extracts the chrominance and luminance carriers from the pseudo-NTSC signal. Block 55 shifts the chrominance carrier to its normal position in an NTSC signal, namely, to 4.83 MHz, as in FIG. 2, which is a frequency lying 3.58 MHz from the luminance carrier. The shifted chrominance carrier is summed with the luminance carrier, in block 58 in FIG. 7, thereby producing an NTSC video signal.

Block 60 of the decoder 40 receives the audio signal, several of which are shown in FIG. 4. Since the audio signal lies outside the pass-band of the pseudo-NTSC signal, block 60 shifts the audio carrier to a frequency within the NTSC passband, as indicated.

The shifted audio signal and the NTSC video signal are summed by summer 65, whose output is delivered to a standard television receiver. The output is a standard NTSC signal, as in FIG. 2, which contains an audio carrier.

If a scrambling system is used, the output is delivered to a de-scrambler, as indicated, prior to delivery to the television receiver.

More Detailed Architecture

Figure 8:
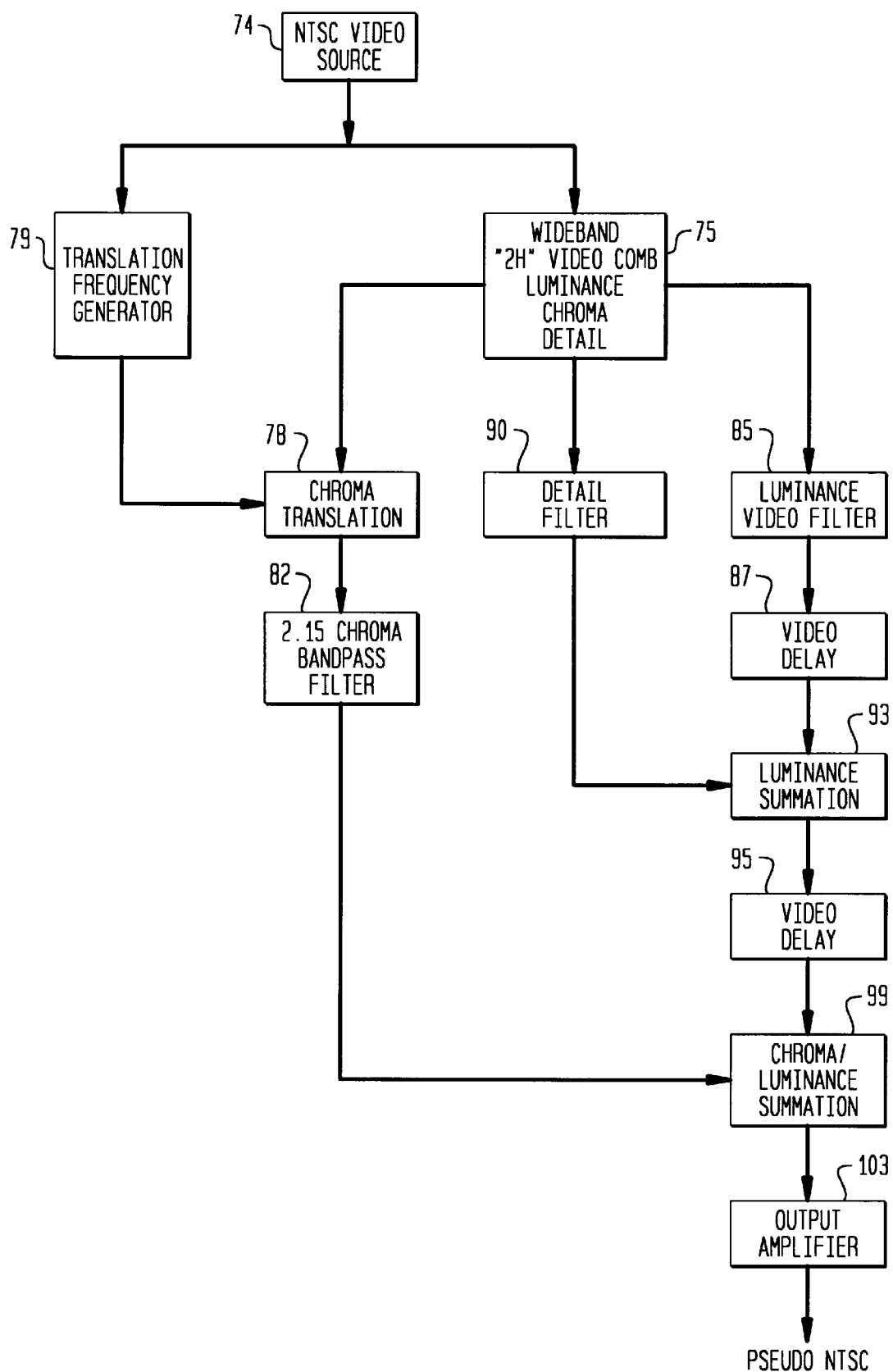
FIG. 8 illustrates another form of an encoder 30 of FIG. 5.

FIG. 8 illustrates a more detailed architecture for an encoder. An NTSC composite video signal, of the type shown in FIG. 2, is generated by commercially available equipment, indicated by block 74. The invention separates the luminance information (ie, luminance carrier, plus sidebands within a selected bandwidth) from the chrominance information (ie, chrominance carrier, plus sidebands within a selected bandwidth) in block 75.

To perform the translation of the chrominance carrier, indicated in block 78, the invention uses a heterodyning operation. At least one additional frequency, such as A or B in FIG. 15, later discussed, is required to perform the heterodyning. This frequency is generated in block 79 in FIG. 8.

Figure 13:
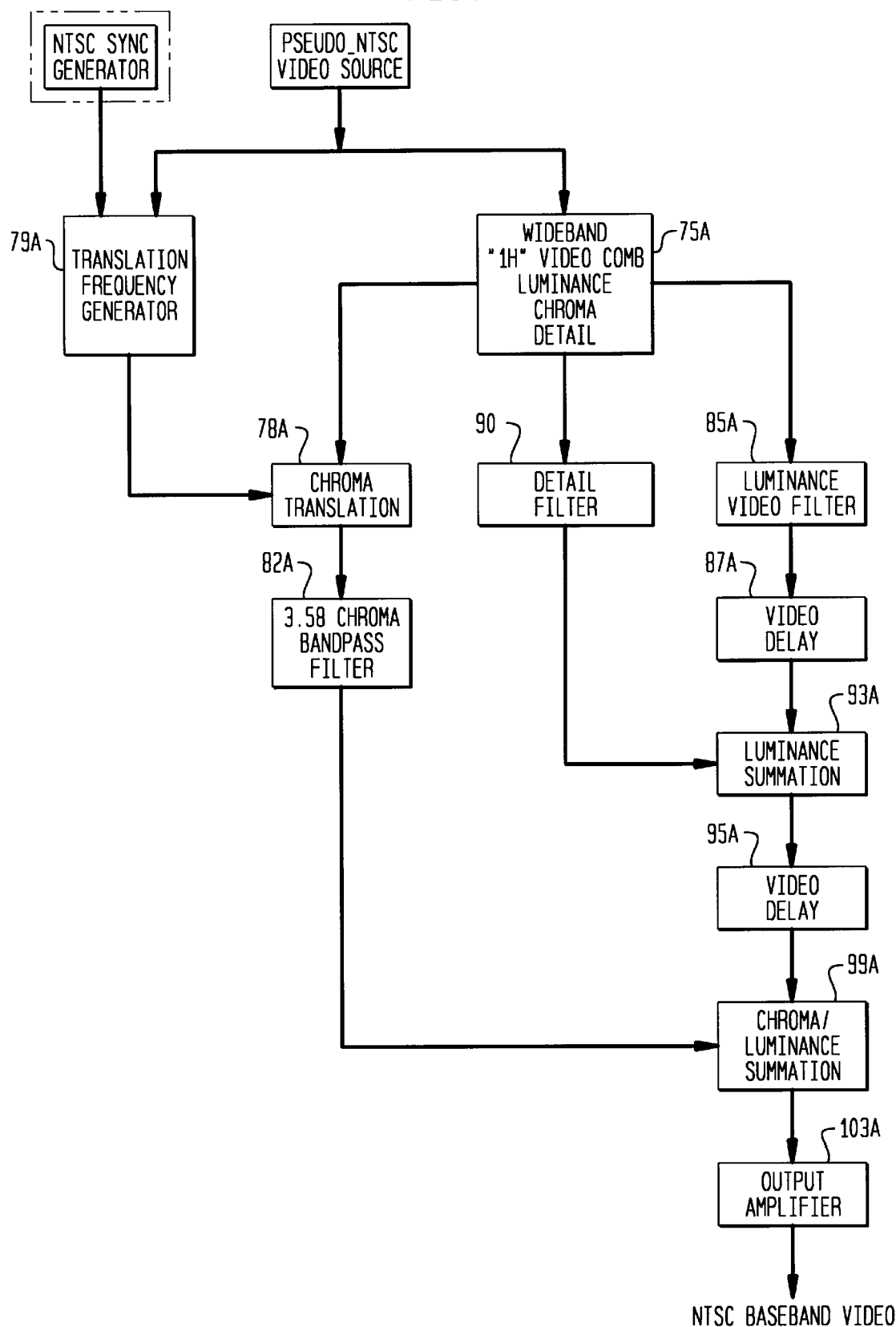
FIG. 13 illustrates another form of a decoder of FIG. 5.

Through the heterodyning, the invention translates the chrominance carrier, in block 78, so that it lies 2.15 MHz from the luminance carrier 3 in FIG. 3. Discussion of the filtering of block 82 will be postponed until a similar filtering function, in block 82A of FIG. 13, is discussed.

Meanwhile, the invention extracts the luminance signal, using luminance video filter 85, and subjects the output, on line 86, to a video delay 87, to compensate for frequency-dependent delays imposed by the preceding filters.

The invention combines output of the delay 87 with the output of a detail filter 90, in block 93. A brief digression will explain the general principles of the detail filter.

Figure 9:
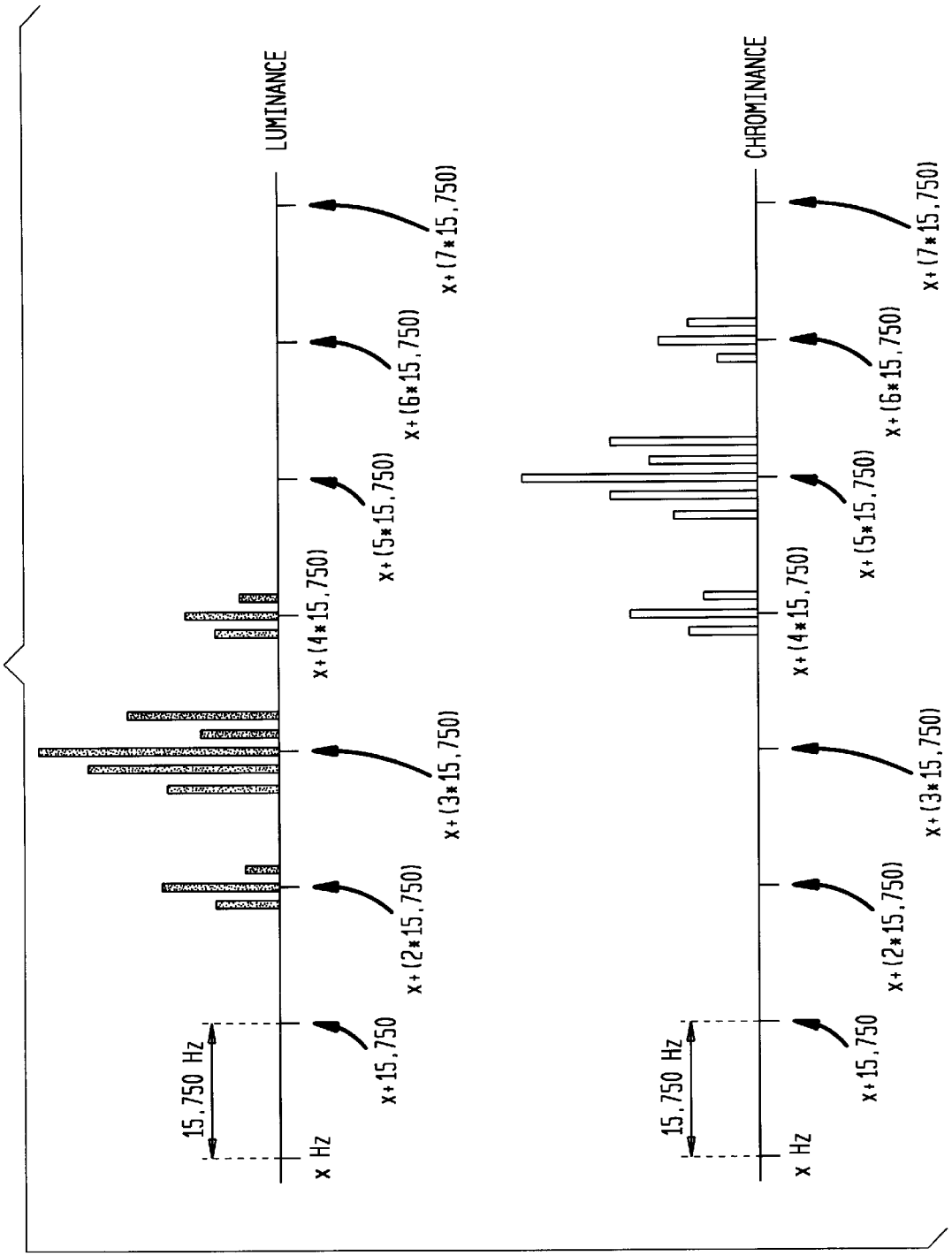
FIG. 9 illustrates how the energy in a luminance signal and a chrominance signal tends to cluster at 15.750 KHz intervals.

It is known within the television art that the luminance information does not occupy the entire frequency spectrum allocated to it. That is, in FIG. 2, luminance information is not distributed uniformly across the entire 6-MHz bandwidth. Instead, luminance information is clustered about specific frequencies, which are found to be multiples of 15,750 Hz, as shown at the top of FIG. 9. The chrominance information is also clustered in a similar way, as shown at the bottom of that Figure. For a static television picture, containing no motion, these clusters are static. They do not change position on the plots of FIG. 9.

One significant feature of the plots of FIG. 9 lies in the empty "space" between the clusters. Prior-art television systems utilize this space, by "interleaving" these two sets of clusters, as illustrated in simplified form at the bottom of FIG. 10. (The clusters of FIG. 9 are depicted as arrows in FIG. 10; dashed arrows represent luminance components and solid arrows represent chrominance components.)

However, the interleaving produces two different signals contained within a single composite signal. The two different signals must be separated. Comb filters, indicated in block 75 in FIG. 8, are used to separate the signals. A comb filter, generally, provides a series of pass-bands 101 in FIG. 11, which resemble the teeth of a comb. The frequencies within the pass-bands 101 are passed; those outside the pass-bands are blocked.

However, the comb filter causes loss of some luminance information, as will be explained with reference to FIG. 12. FIG. 12 is a simplified form of FIG. 11. In FIG. 12 each arrow represents a cluster of information shown in FIG. 11.

Figure 10:
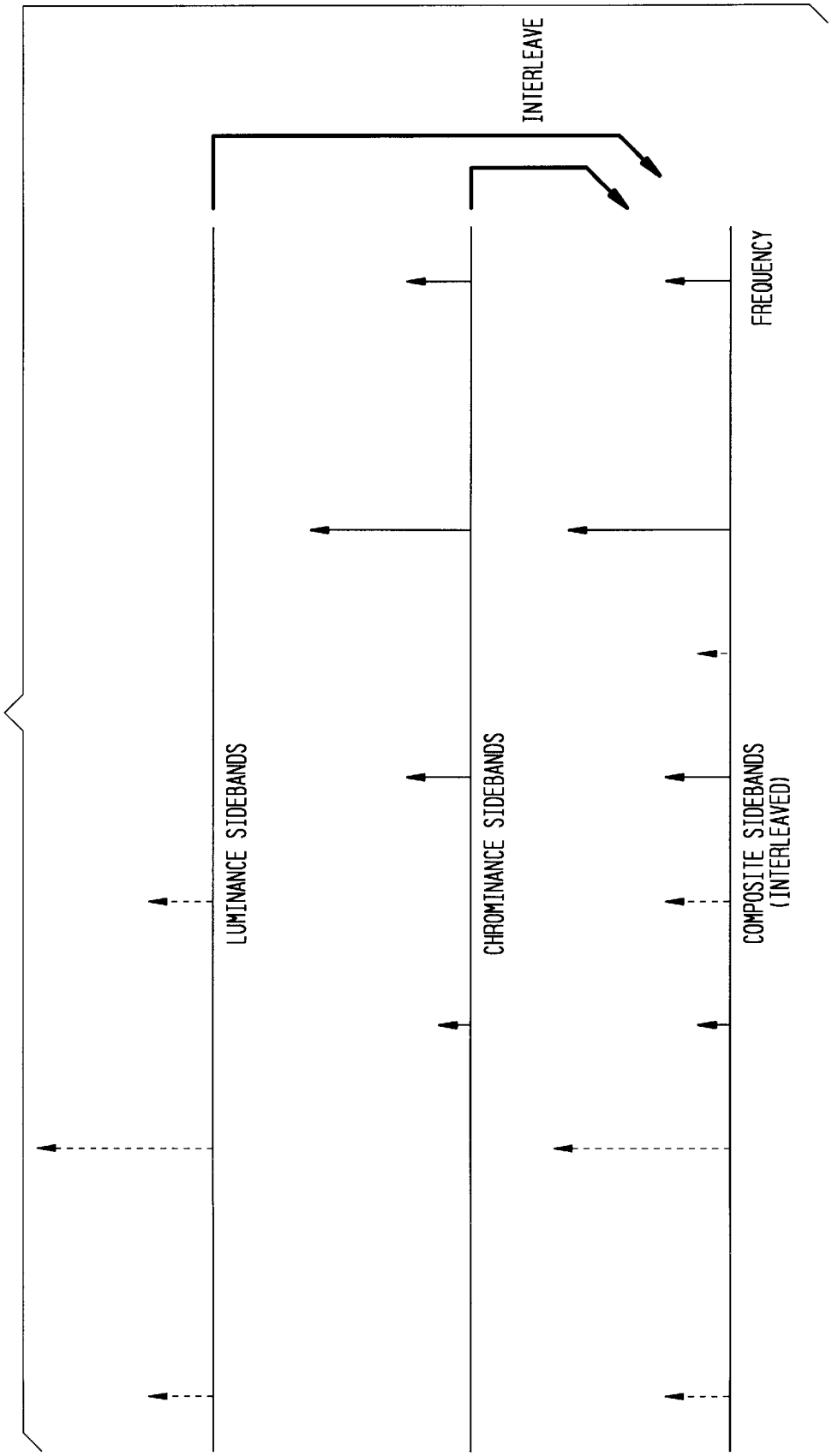
FIG. 10 illustrates interleaving of luminance and chrominance signals.
Figure 11:
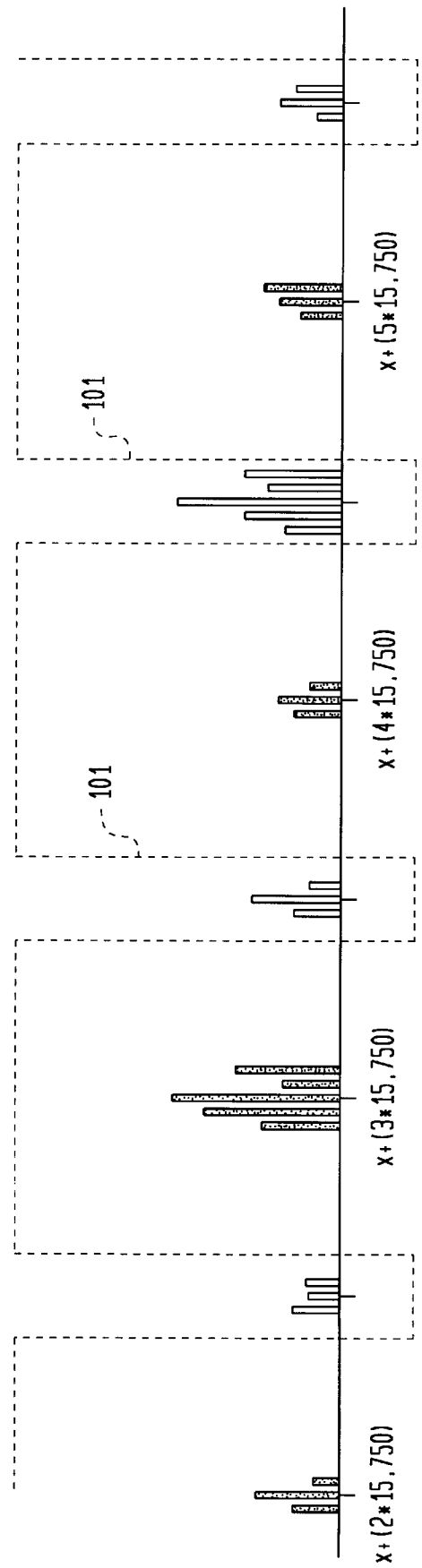
FIG. 11 illustrates a comb filter having pass-bands 101.
Figure 12:
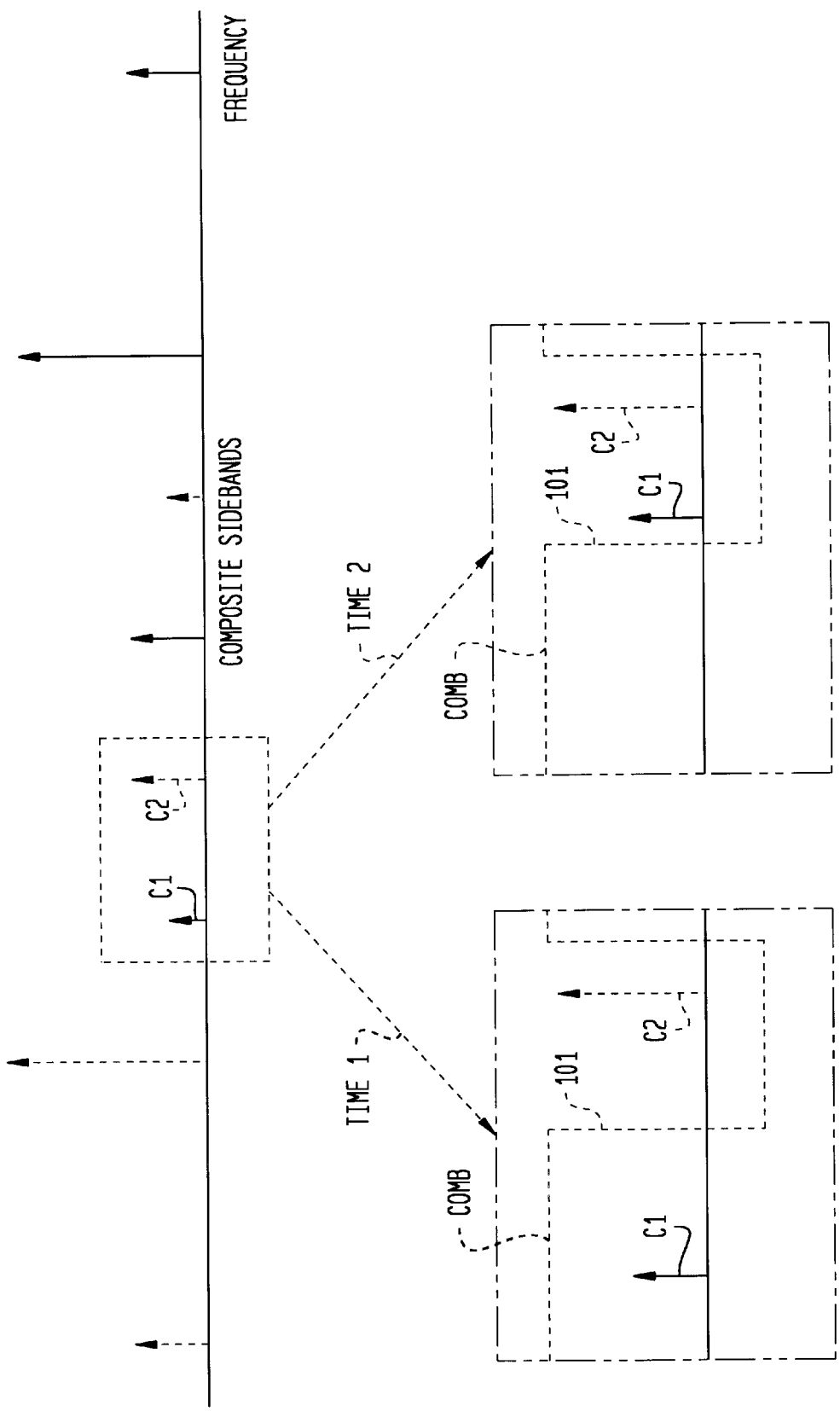
FIG. 12 illustrates how cluster C1 can move with time, and become lost.

It was stated above that, when motion is absent in the video picture, the clusters shown in FIGS. 9–11 remain stationary. However, when motion does occur, the clusters move about within the frequency spectrum. This motion can cause a loss of luminance information, because the moving luminance and chrominance sidebands can enter, and leave, the pass-bands 101 of the comb filter.

For example, clusters C1 and C2 in FIG. 12 will be considered at two different times, TIME__1 and TIME__2. As the Figure indicates, at TIME__1, cluster C1 lies outside pass-band 101. However, at TIME__2, cluster C1 now lies within pass-band 101, and is passed along with cluster C2. Now, chrominance information (represented by C1) has contaminated luminance information (represented by C2). Luminance information is thereby lost.

The invention accommodates this loss by block 90 in FIG. 8. This block, which performs an operation known as detail filtering, restores the lost information to the luminance signal. Detail filters are known in the art. In general terms, the detail filter is designed to predict information which will be lost, and to extract similar information from the original NTSC signal, in order to replace the lost information.

In FIG. 8, block 93 produces a luminance signal, based on the output of the detail filter 90 and the video delay 87.

A second delay 95 is imposed, and then the luminance signal and the shifted chrominance signal are summed in summer 99. The output of summer 99 is a pseudo-NTSC signal, of the type shown in FIG. 3. This signal is amplified by amplifier 103, and delivered to the cable network 35 of FIG. 5.

Processing of the audio signal is not shown in FIG. 8, and is substantially the same as described in connection with FIG. 6.

Apparatus for decoding the pseudo NTSC signal is illustrated in FIG. 13. The discussion given with respect to FIG. 8 applies to this Figure, with two general exceptions. One is that the comb filter 75A is of the "2H" type, as opposed to the "1H" type in FIG. 8.

A second is that bandpass filter 82 in FIG. 8 is replaced by a bandpass filter 82A in FIG. 13. The passbands of these two filters are shown respectively in FIG. 14. These filters perform several functions.

However, prior to discussing these functions, an issue which arises in the shifting of the chrominance carrier from the position shown in FIG. 2 to that shown in FIG. 3 will be discussed.

Figure 15:
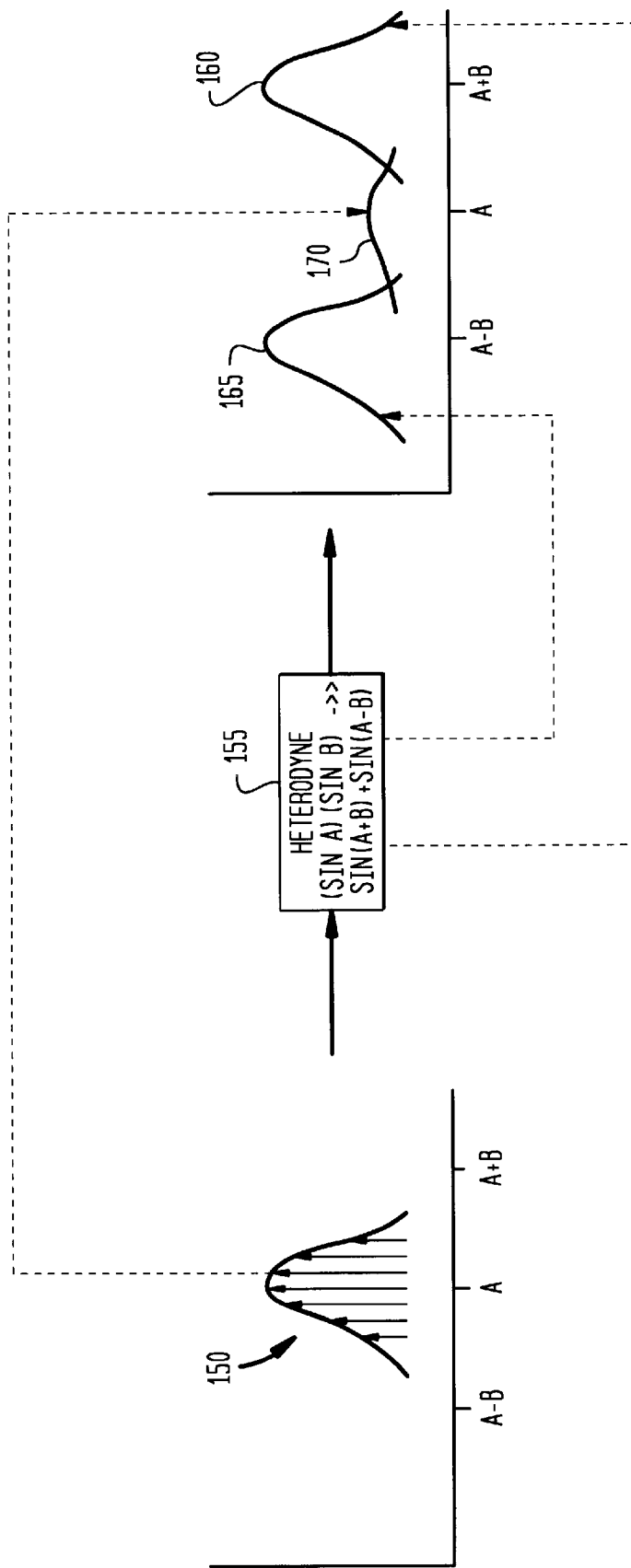
FIG. 15 illustrates imperfections which occur in a heterodyning operation

FIG. 15 illustrates some phenomena found in the process of frequency-shifting, or heterodyning. Signals 150 represent the frequency spectrum of a chrominance signal. In heterodyning, indicated by block 155, an individual signal, such as SIN A, is multiplied by another signal, such as SIN B, to produce two other signals, namely, SIN (A+B) and SIN (A−B). That is, two copies of the original signal are produced, one at frequency (A+B) and the other at frequency (A−B).

Since the heterodyning can be viewed as being applied to each individual signal within the group of signals 150, two copies of the group 150 are generated. One copy lies at frequency (A+B) and the other copy lies at frequency (A−B), as indicated by envelopes 160 and 165. (Individual signals are not shown within these envelopes, to avoid clutter.)

One of these copies is used, and one is discarded. For example, in the frequency translation required to move the chrominance carrier downward, from the position shown in FIG. 2 to that shown in FIG. 3, the chrominance carrier must be reduced in frequency. The envelope 165 in FIG. 15 is used, and envelope 160 is ignored.

However, the heterodyning operation is not perfect. A small replica of the original group of signals 155 leaks through, as indicated by envelope 170. This replica 170 is attenuated by about 60 dB, which corresponds to a reduction by about a factor of one million. Despite the seemingly small size of this leakage signal 170 (about one-millionth the size of signal 150), the Inventor has found that it creates undesirable interference.

Figure 16:
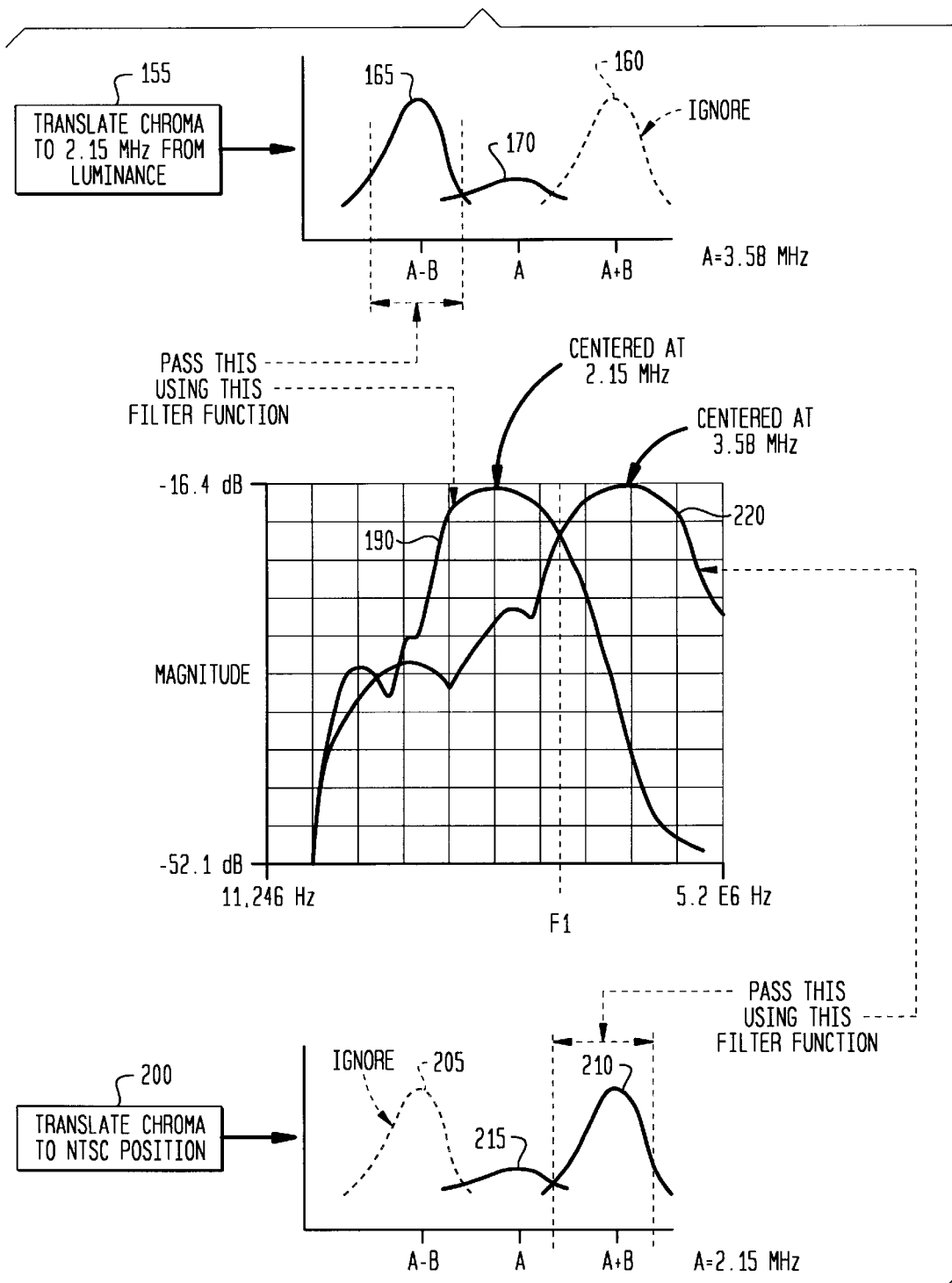
FIG. 16 illustrate processes which the invention uses to isolate various spectra, such as spectra 165, 170, and 160 in FIG. 15, which are obtained from a heterodyning operation.

To reduce this interference, the invention filters out much of leakage signal 170. This filtering is illustrated in FIG. 16. The top of the Figure indicates the translation of the chrominance carrier from the position shown in FIG. 2 to that shown in FIG. 3. The heterodyning indicated by block 155 produces two copies 160 and 165, plus leakage signal 170. Copy 160 is ignored, as indicated. Frequency A is 3.58 MHz, corresponding to the position of the chrominance signal in FIG. 2.

Figure 14:
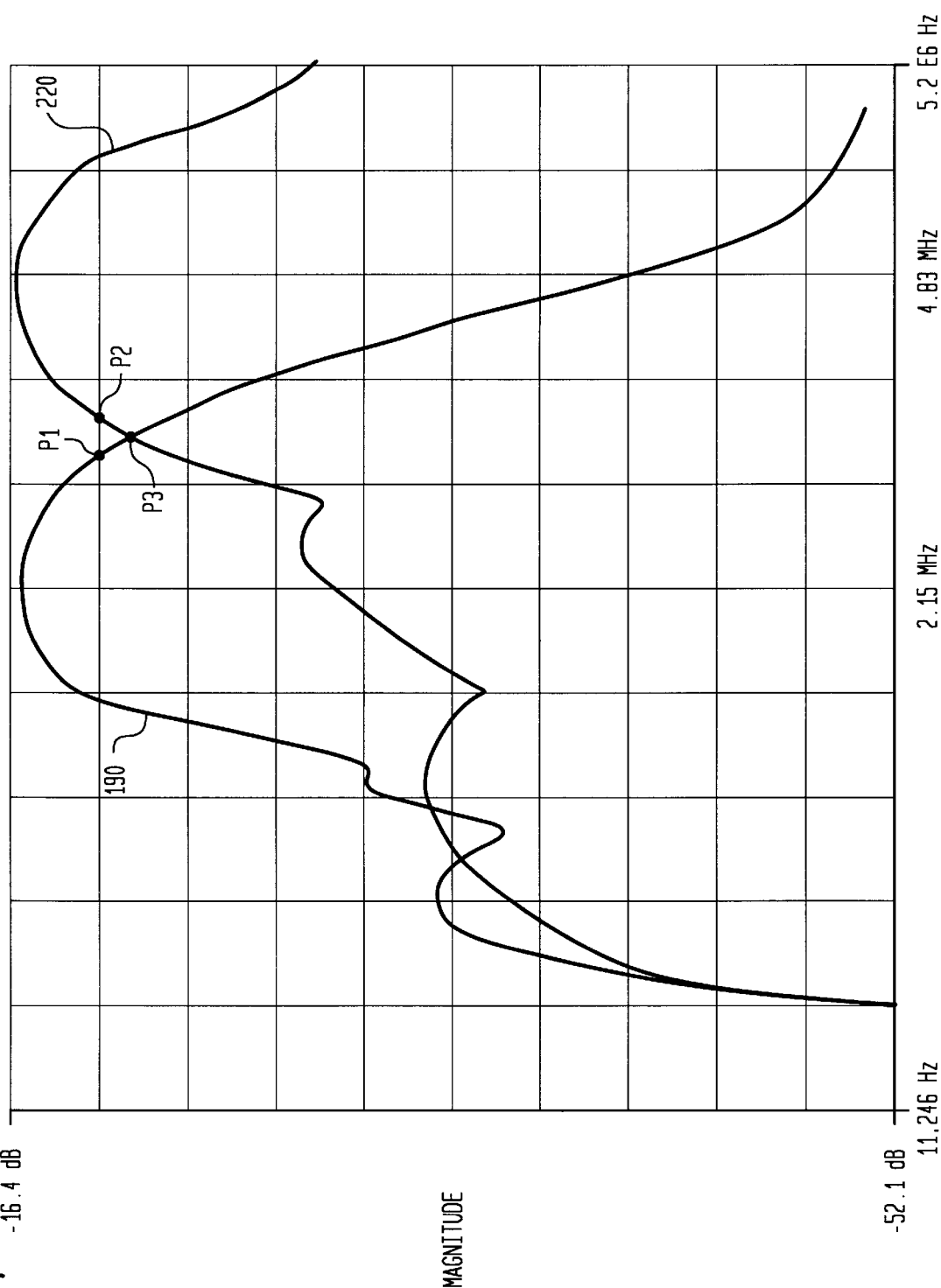
FIG. 14 illustrates pass-bands of idealized filters used to perform the functions of block 78 in FIG. 8 and block 78A in FIG. 13.

The remaining two signals 165 and 170 are filtered by a filter having a filter function 190, which is also shown in FIG. 14, which is drawn approximately to scale. This filter has a center frequency of 2.147727 MHz, indicated as 2.15 MHz, with respect to the luminance carrier. This filter is preferably a three, or four, pole type. The bandwidth of the filter, measured between 3-dB points, is 300 KHz. Restated, the filter acts as a bandpass filter, to pass 300 KHz of bandwidth of the chrominance signal.

After the translation of the chrominance signal just described, and extraction of the audio signal as described above, the video signal is transmitted as the pesudo-NTSC composite signal indicated in FIG. 3. The translated chrominance carrier is indicated as carrier 15 in FIG. 3.

For an ordinary television receiver to view the signal, it must be converted to the NTSC composite signal of FIG. 2: the chrominance carrier must be shifted up in frequency, from the position shown in FIG. 3 to that shown in FIG. 2.

This up-shifting of the chrominance carrier of FIG. 3 is accomplished by the heterodyning of block 200 in FIG. 16. Two copies, 205 and 210, of the chrominance signal are produced, plus a leakage signal 215, which is, again, attenuated by about 60 dB. Frequency A is 2.15 MHz, corresponding to the frequency of the chrominance signal in FIG. 3. The lower signal 205 is ignored, and a filter having a filter function 220 is applied to signals 210 and 215, in order to reduce the leakage signal 215. The filter producing this function 220 is substantially the same as that producing function 190, with the exception of the center frequency, which is 3.58 MHz for function 220.

After filtering, the signal 210 represents the chrominance information which is fed to the television receiver, in the NTSC composite signal.

A significant feature lies in the location of the intersection point of the two filter functions 190 and 220, which is indicated as F1 in FIG. 16, and as point P1 in FIG. 14. That intersection point is about mid-way between the center frequencies of 2.15 and 3.58 MHz, and results from the fact that both filter functions possess similar bandwidths.

Figure 17:
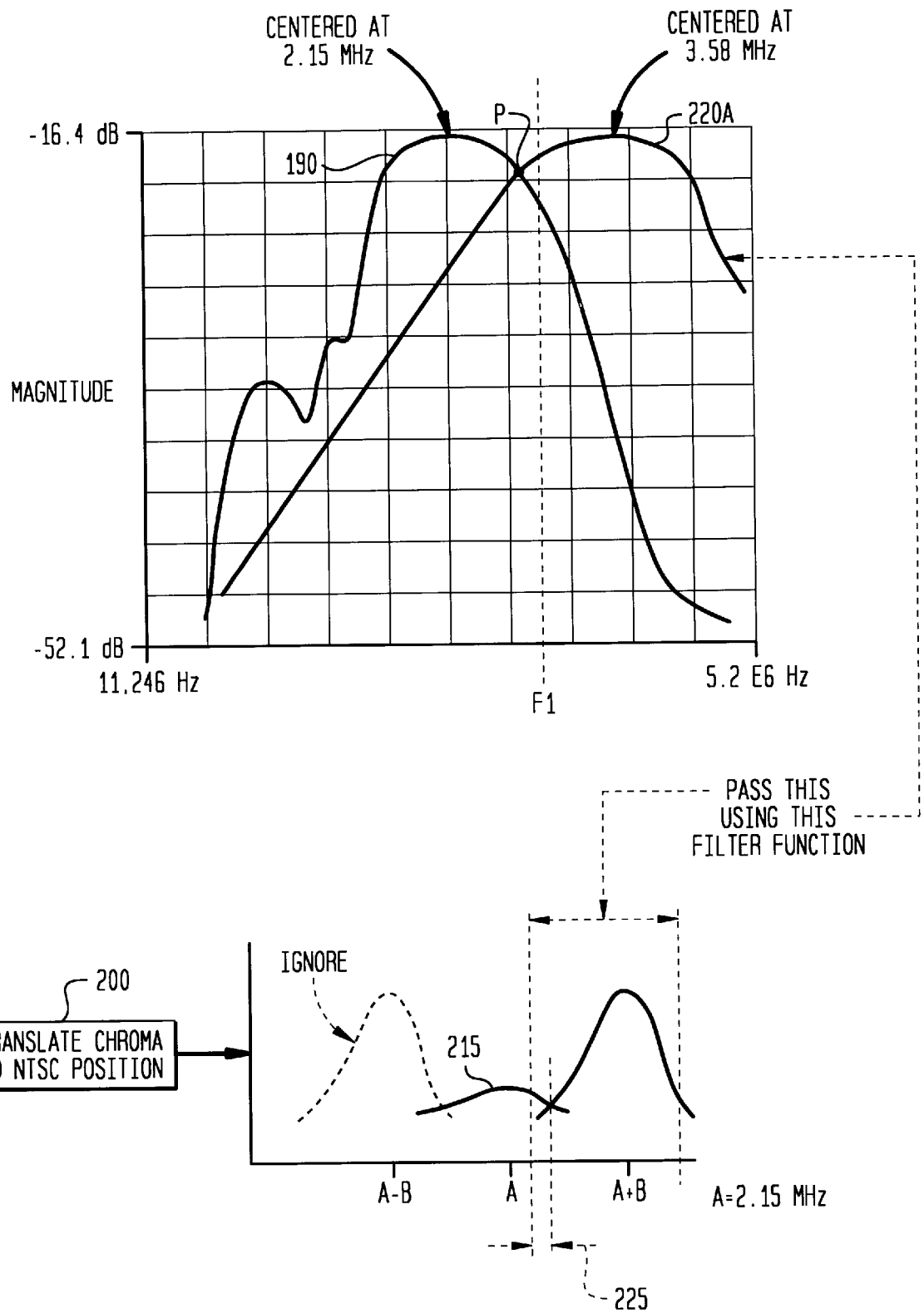
FIG. 17 illustrates how a leakage signal produced by a heterodyning operation can contaminate a desired signal, if the bandwidth of a particular filter is excessively wide.

If one filter function had a larger bandwidth, as indicated by function 220A in FIG. 17, then the intersection point P would lie to the left of F1. Since a larger bandwidth would be passed by function 220A, more of the leakage signal 215, indicated by band 225 at the bottom of the Figure, would be passed as well. Passing of this band 225 is undesirable. A similar passing of leakage signal 170 in FIG. 16 would occur, if function 190 had a larger bandwidth than function 220.

Therefore, it is preferable that functions 190 and 220 have similar bandwidths, which causes their intersection point, at F1 in FIG. 16, to lie approximately mid-way between them. (The intersection is approximately mid-way, and not exactly mid-way, because the filter functions are not symmetrical about their center points.)

Processing of the audio signal is not shown in FIG. 13, and is substantially the same as described in connection with FIG. 7.

A significant feature is the use of 2.147727 MHz as the frequency by which the chrominance carrier in FIG. 3 is displaced from the luminance carrier. Oscillators having a frequency of 42.95454 MHz are commercially available, and are commonly used in televisions. Dividing this frequency in the following four different processes produces four frequencies, some of which are used by the television, and some by the invention.

1. Dividing by 2, and then by 6, produces 3.579545 MHz, which is frequency A, at the top of FIG. 16, and the NTSC chrominance displacement frequency in FIG. 2.
2. Dividing by 2, and then by 10, produces 2.147727 MHz, which is frequency A, at the bottom of FIG. 16, and the pseudo-NTSC displacement frequency of FIG. 3.
3. Dividing by 2730 produces 0.015734 MHz, which is a horizontal scanning frequency.
4. Dividing by 5, then by 3, and then doubling, produces 5.72727 MHz, which is the sum of 2.147727 MHz and 3.579545 MHz.

Thus, the displacement frequency of 2.147727 MHz, between the chrominance carrier and the luminance carrier in FIG. 3, can be derived directly from a frequency of 42.95454, which is commercially available, and used to produce other frequencies used within televisions.

Numerous substitutions and modifications can be undertaken without departing from the true spirit and scope of the invention. What is desired to be secured by Letters Patent is the invention as defined in the following claims.

I claim:

1. An encoder for producing television signals, comprising:
    a) means for accepting a video signal; and
    b) means for deriving a composite video signal from the video signal, having a bandwidth of about 4.0 MHz, and having chrominance and luminance carriers separated by about 2.15 MHz.

2. Encoder according to claim 1, and further comprising:
    c) means for
        i) accepting an audio carrier, and
        ii) placing the audio carrier outside said bandwidth.

3. A decoder for television signals, comprising:
    a) means for accepting a first composite video signal having
        i) a first bandwidth of about 4.0 MHz and
        ii) chrominance and luminance carriers separated by about 2.15 MHz; and
    b) means for deriving a second composite video signal from the first composite video signal, having
        i) a second bandwidth of about 6.0 MHz, and
        ii) chrominance and luminance carriers separated by about 3.58 MHz.

4. Decoder according to claim 3, and further comprising:
    c) means for
        i) accepting an audio carrier lying outside said first bandwidth; and
        ii) placing said audio carrier within said second bandwidth.

5. An encoder for a video signal, comprising:
    a) means for accepting luminance and chrominance carriers from a source of video information;
    b) means for shifting the chrominance carrier to a frequency lying about 2.15 MHz from the luminance carrier;
    c) means for deriving a composite video signal from the luminance carrier and the shifted chrominance carrier;
    d) means for limiting the composite video signal to a bandwidth of about 4.0 MHz; and
    e) means for accepting an audio signal from a source, and transmitting it using a carrier lying outside said bandwidth.

6. Encoder according to claim 5, in which the source of video information, which provides the chrominance and luminance signals to the means of 5(*a*), provides the chrominance and luminance carriers within a composite video signal.

7. Encoder according to claim 5, in which the source of video information provides the chrominance and luminance carriers as separate signals.

8. A decoder for a video signal, comprising:
    a) means for accepting a band-limited composite video signal which contains luminance and chrominance carriers;
    b) means for extracting the chrominance carrier from the composite video signal;
    c) means for shifting the chrominance carrier to a frequency lying about 3.58 MHz from the luminance carrier;
    d) means for deriving a composite video signal from the luminance carrier and the shifted chrominance carrier;
    e) means for
        i) accepting an audio signal carried by a carrier lying outside the band of the first composite video signal;
        ii) shifting the carrier to a frequency lying within the band of the second composite video signal;
        iii) adding the shifted carrier of paragraph (e)(ii) to the second composite video signal.

9. Decoder according to claim 8, in which the chrominance and luminance carriers of the first composite video signal are separated in frequency by about 2.15 MHz.

10. A method of transmitting a video signal, comprising the following steps:

a) transmitting a luminance carrier and a chrominance carrier at frequencies separated by approximately 2.15 MHz;

b) limiting the video signal to a pass-band of about 4.0 MHz; and c) transmitting an audio carrier outside said pass-band.

11. In a video transmission system, an improvement comprising the following steps:

a) at a transmitter,
 i) frequency-shifting a chrominance carrier toward an associated luminance carrier; and then
 ii) summing the chrominance carrier with the luminance carrier, to produce a first composite video signal; and then
 iv) transmitting the first composite video signal to a receiver;

b) at the receiver,
 i) receiving the first composite video signal; and then
 ii) frequency-shifting the chrominance information away from the luminance carrier; and then
 iii) summing the chrominance carrier with the luminance carrier, to produce a second composite video signal.

12. System according to claim 11, in which c) the first composite video signal occupies a first pass-band, and d) the transmitter transmits an audio signal lying outside said first pass-band.

13. System according to claim 12, in which e) the second composite video signal occupies a second pass-band, and f) the audio signal is brought within the second pass-band.

14. A method of processing a video signal, comprising the following steps:

a) at a transmitter:
 i) extracting a chrominance carrier from an NTSC signal;
 ii) shifting the chrominance carrier to a lower frequency;
 iii) bandpass-filtering t he chrominance carrier using a filter having a first filter function at a first center frequency, and then creating a composite signal, having a smaller bandwidth than the NTSC signal, which contains the chrominance signal;

b) transmitting the composite signal to a receiver;

c) at a receiver:
 i) shifting the chrominance carrier to a higher frequency;
 ii) bandpass-filtering the chrominance carrier using a filter having a second filter function at a second center frequency, which intersects the first filter function approximately mid-way between the first and second frequencies, and then creating a composite NTSC signal, which contains the chrominance signal.

* * * * *